W. Gee,

Soda-Water Apparatus,

No. 2,177, Reissued Feb. 20, 1866.

Witnesses:

L. Holmes Jr.
J. N. Connolly

Inventor:

W. Gee

N. PETERS, PHOTO-LITHOGRAPHER, WASHINGTON, D. C.

UNITED STATES PATENT OFFICE.

WILLIAM GEE, OF NEW YORK, N. Y.

IMPROVEMENT IN APPARATUS FOR DRAWING SODA-WATER.

Specification forming part of Letters Patent No. 38,577, dated May 19, 1863; Reissue No. 1,612, dated February 2, 1864; Reissue No. 2,177, dated February 20, 1866.

*To all whom it may concern:*

Be it known that I, WILLIAM GEE, of the city, county, and State of New York, have invented a new Apparatus for Drawing Soda or Mineral Water; and I do hereby declare that the following is a full, clear, and exact description thereof, reference being had to the accompanying drawings, forming part of this specification.

The nature of my invention consists in furnishing a cock or draft apparatus for drawing soda or mineral water with two valves and a properly arranged system of passages, whereby enough water may be drawn in a small stream through a small aperture with sufficient force to mix well the sirup, then a proper quantity through a larger aperture to fill the glass without the aid of a second glass or vessel, and in about one-half the time done by the old method, and making the soda-water more sparkling.

To enable others to make and use my invention, I will proceed to describe that form of it which I consider the simplest and best, with reference to the drawings.

Figure 3:
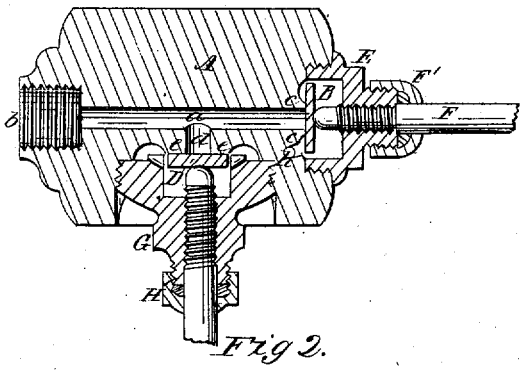
Figure 1:
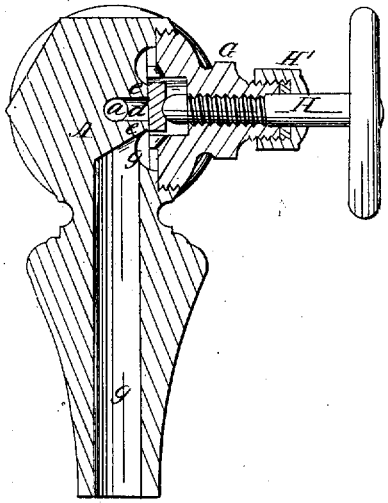
Figure 2:
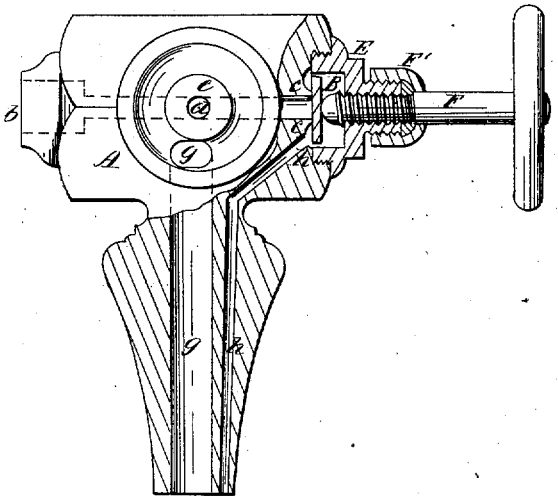

Figure 1 is a central vertical section of the apparatus, showing the larger draft-passage or aperture and its valve. Fig. 2 is a view taken at right angles to Fig. 1, with the valve for opening the large draft passage or aperture removed to expose the said passage to view, and representing the cocks partly in section to show the small draft-passage and its valve. Fig. 3 is a horizontal section of the same, showing the relative position and arrangement of the two valves.

Similar letters of reference indicate corresponding parts in the several figures.

A is the body of the cock, of T-shape in its longitudinal vertical section, as shown in Fig. 1, and having a longitudinal main passage, *a*, directly through it, extending from the end *b*, where it connects with the draft-pipe to the opposite end where is situated the seat *c* of the valve B, which is opened to draw the small stream from this passage. At about the middle of its length branches off a lateral passage, *d*, to the seat *e* of the valve D, which is opened to draw the large stream, the said seat being on one side of the body A. From the valve-seat *e* the larger draft passage or aperture *g*, much larger than the passages *a d*, extends down through the bib *f* of the cock to the bottom thereof, and from the valve-seat *c* the smaller draft passage or aperture *h*, much smaller than the passages *a d*, extends downward to a point near the passage or aperture *g*, and thence directly downward at one side of the latter passage or aperture, the external orifices of both apertures or passage being side by side in the bottom or mouth of the bib. The valves may be of the kind commonly used in what are known as "compression cocks." The valve B is covered by a cap, E, which forms the nut for the screw on the operating-spindle F of the said valve, and which is fitted with a stuffing-box, F′, to prevent leakage around the said spindle; and the valve D is covered by a cap, G, which forms the nut for the screw on the operating-spindle H of the said valve, and which is fitted with a stuffing-box, H′, to prevent leakage around the said spindle.

To draw soda water the valve B is first opened to let the water pass out from the main passage *a* through the smaller passage or aperture *h*, in a small sharp stream for the purpose of mixing the sirup. Then this valve is closed and the valve D opened to allow the water to pass from the passages *a d*, through the larger passage or aperture *g*, in a larger stream for the purpose of filling up the glass without too much foam, and without the use of a second glass or vessel, as was customary with the old draft cock or apparatus, with which the method of operation was first to draw a suitable quantity of water into the sirup in one glass to mix, then to put down this glass and draw more water into another glass and pour it therefrom into the first.

In drawing soda-water by the last-described method, the gas is all out before the glass could reach the mouth of the person who is to drink it—for, in drawing soda-water through a small hole or opening, (the friction of the water passing out and striking the glass or vessel,) it must lose the gas which causes the water to sparkle, if it could be retained.

With my cock or apparatus I draw a portion of the soda-water through the small passage or aperture as above mentioned, and then the remaining portion through the large one, the latter passing first through the smaller passages *a d*, and thence into a much larger passage, *g*, and being thereby caused to flow out in a gentle stream, and at the same time retaining the gas, making the soda-water more sparkling and much better, besides drawing it in one-half the time of the old method, which is another great advantage.

I do not confine myself to the precise construction or arrangement of the parts herein described and represented in the drawings; but

What I claim as my invention, and desire to secure by Letters Patent, is—

1. The valve D and its parts *e* G H H′, and passage or aperture *g*, in combination with the valve B and its parts *c* E F F′, and passage or aperture *h*, forming a cock, for the purpose set forth.

2. The means of drawing soda or mineral water from a small and a large outlet passage or aperture having one connection with a draft-tube or soda-water apparatus, substantially as and for the purpose herein specified.

3. The small passage or aperture *a*, for the purpose of compressing the soda-water while being admitted into the large passage or outlet-aperture *g*, for the purpose set forth.

4. Drawing soda-water in a large stream passing first through a smaller passage into a larger passage or space from which proceeds the larger stream.

5. Drawing soda or mineral water in a large and small stream from one nozzle or opening in connection with a fountain or other apparatus, substantially as herein described.

WILLIAM GEE.

Witnesses:
HENRY T. BROWN,
J. W. COOMBS.